US006993761B1

(12) United States Patent
Czajkowski et al.

(10) Patent No.: US 6,993,761 B1
(45) Date of Patent: Jan. 31, 2006

(54) METHOD AND APPARATUS TO VERIFY TYPE SAFETY OF AN APPLICATION SNAPSHOT

(75) Inventors: Grzegorz J. Czajkowski, Mountain View, CA (US); Mario I. Wolczko, San Carlos, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 837 days.

(21) Appl. No.: 09/675,116

(22) Filed: Sep. 28, 2000

(51) Int. Cl.
*G06F 9/46* (2006.01)
*G06F 15/16* (2006.01)

(52) U.S. Cl. .................. 718/100; 709/202; 717/124; 717/126

(58) Field of Classification Search ............ 709/100, 709/102, 104, 200, 201; 717/124, 126; 718/100, 718/102, 104
See application file for complete search history.

(56) References Cited

U.S. PATENT DOCUMENTS

| | | | | |
|---|---|---|---|---|
| 5,668,999 A | * | 9/1997 | Gosling | 717/126 |
| 5,748,964 A | * | 5/1998 | Gosling | 717/126 |
| 5,999,731 A | * | 12/1999 | Yellin et al. | 717/126 |
| 6,052,732 A | * | 4/2000 | Gosling | 709/229 |
| 6,075,940 A | * | 6/2000 | Gosling | 717/126 |
| 6,247,171 B1 | * | 6/2001 | Yellin et al. | 717/126 |
| 6,477,702 B1 | * | 11/2002 | Yellin et al. | 717/126 |
| 6,496,871 B1 | * | 12/2002 | Jagannathan et al. | 719/317 |
| 6,704,923 B1 | * | 3/2004 | Gosling | 717/128 |

* cited by examiner

*Primary Examiner*—Majid Banankhah
*Assistant Examiner*—Syed J Ali
(74) *Attorney, Agent, or Firm*—Park, Vaughan & Fleming, LLP

(57) ABSTRACT

One embodiment of the present invention provides a system for verifying type safety of an application snapshot. This application snapshot includes a state of an executing program that is moved from a first computing device to a second computing device across a network in order to continue execution on the second computing device. The system operates by receiving the application snapshot from the first computing device on the second computing device, wherein the application snapshot includes a subprogram, an operand stack, and a point of execution. The system then examines the application snapshot to identify one or more subprograms and the point of execution within the subprograms. Next, the system examines the subprogram to determine an expected structure of the operand stack at the point of execution. After the expected structure of the operand stack has been determined, the system verifies that the state of the application snapshot on the second computing device does not violate type safety in the sense of a platform-independent programming language. Execution of the application snapshot is resumed on the second computing device if the verification does not fail.

15 Claims, 2 Drawing Sheets

METHOD AND APPARATUS TO VERIFY TYPE SAFETY OF AN APPLICATION SNAPSHOT

BACKGROUND

1. Field of the Invention

The present invention relates to moving an executing program from one computing device to another computing device. More specifically, the present invention relates to a method and an apparatus for validating that an application snapshot that is moved from one computing device to another computing device has not been corrupted and can be run safely on the second computing device.

2. Related Art

The recent proliferation of computer networks such as the Internet has lead to the development of platform-independent computer languages, such as the JAVA™ programming language distributed by Sun Microsystems, Inc. of Palo Alto, Calif. Programs written in platform-independent languages can be migrated from one computing device to another computing device to effect load balancing, check pointing, and portability. In order to migrate code that is currently executing, related information must be moved along with the program code. This related information defines the state of the executing code and can include the code, data objects, and an operand stack. This composite of information is referred to as an "application snapshot."

Sun, the Sun logo, Sun Microsystems, and JAVA are trademarks or registered trademarks of Sun Microsystems, Inc. in the United States and other countries.

Current verification methods are static. In existing systems, prior to the beginning of execution on the first computing device, a code verifier ensures, at a minimum, that executing the code creates no operand stack overflows or underflows, that all local variable uses are type safe, and that the arguments to each of the instructions are of valid types. This ensures that the application will remain in a valid state during execution on the first computing device, so that no instruction will cause harm to any other application or data that coexists on the first computing device.

In an execution environment based on a type safe language, such as the JAVA programming language, it is important to ensure that receiving and resuming execution of an application snapshot will not lead to any violations of type safety. In other words, the receiving system must ensure that no invariants and guarantees are compromised.

When the application snapshot migrates across a network to a second computing device, the application snapshot is modified to incorporate changes for the environment that exists on the second computing device, such as different addresses for pointers. After the application snapshot has been modified, a code verifier, similar to the code verifier on the first computing device, examines the code.

However, note that the code verifier examines only static portions of the application snapshot, namely the code. The code verifier does not examine the non-static portions of the application snapshot, such as the operand stack and data objects to ensure that the state of the application snapshot is consistent with what the state of the application snapshot should be at the point of execution of the code. After examination by the code verifier, execution continues at the point where it was suspended on the first computing device. Since the state of the application snapshot has not been checked to ensure that the state of the application snapshot is consistent with what the state of the application snapshot should be at the point of execution of the code, the system assumes that the application snapshot arrived intact at the second computing device.

While this assumption is usually correct, there are many reasons why the assumption may not be valid. The application snapshot may have been accidentally corrupted as it traveled across the network. Another possibility is that an attacker has modified the application snapshot with malicious intent. In either case, resuming execution of the code on the second computing device can potentially cause damage to data and files, including operating system files.

What is needed is a system that ensures that the application snapshot arrives at the second computing device in a state that will not cause damage to data and files located on the second computing device and will not cause the second computing device to execute code that is not intended to be part of the executing program.

SUMMARY

One embodiment of the present invention provides a system for verifying type safety of an application snapshot. This application snapshot includes a state of an executing program that is moved from a first computing device to a second computing device across a network in order to continue execution on the second computing device. The system operates by receiving the application snapshot from the first computing device on the second computing device, wherein the application snapshot includes a subprogram, an operand stack, and a point of execution. The system then examines the application snapshot to identify one or more subprograms and the point of execution within the subprograms. Next, the system examines the subprogram to determine an expected structure of the operand stack at the point of execution. After the expected structure of the operand stack has been determined, the system verifies that the state of the application snapshot on the second computing device does not violate type safety in the sense of a platform-independent programming language. Execution of the application snapshot is resumed on the second computing device if the verification does not fail.

In one embodiment of the present invention, examining the subprogram to determine the expected structure of the operand stack at the point of execution involves examining the subprogram with a code verifier. This code verifier ensures that the subprogram does not cause the operand stack to overflow and underflow, that using local variables does not violate type safety, and that arguments of instructions are of expected types.

In one embodiment of the present invention, the operand stack contains zero or more local variables, zero or more arguments that are passed as parameters to the subprogram, and an offset to the point of execution within a subprogram.

In one embodiment of the present invention, the expected structure of the operand stack includes the collective size of entries on the operand stack and the types of entries expected on the operand stack at the point of execution within the subprogram.

In one embodiment of the present invention, the second computing device restores the state of an object within the application snapshot by changing a pointer from an address of the object on the first computing device to an address of the object on the second computing device.

In one embodiment of the present invention, validating the state of the application snapshot includes ensuring that the collective size of entries and the types of entries on the operand stack agree with the collective size of entries and the types of entries expected on the operand stack.

In one embodiment of the present invention, resuming execution of the application snapshot involves restarting the subprogram at the point of execution within the second computing device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
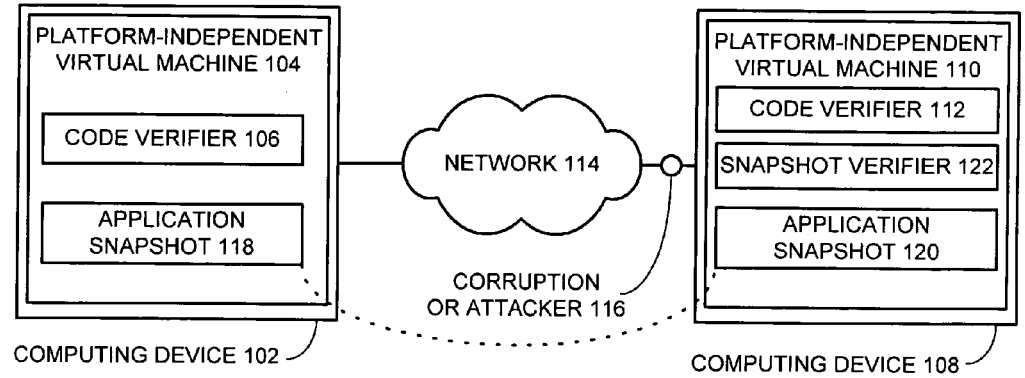
FIG. 1 illustrates computing devices coupled together by a network in accordance with an embodiment of the present invention.

FIG. 1 illustrates computing device 102 and computing device 108 coupled together by network 114 in accordance with an embodiment of the present invention. Computing device 102 and computing device 108 may include any type of computer system, including, but not limited to, a computer system based on a microprocessor, a mainframe computer, a digital signal processor, a personal organizer, a device controller, and a computational engine within an appliance.

Network 114 can include any type of wire or wireless communication channel capable of coupling together computing nodes. This includes, but is not limited to, a local area network, a wide area network, or a combination of networks. In one embodiment of the present invention, network 114 includes the Internet.

Computing device 102 can generally include any node on network 114 including computational capability and including a mechanism for communicating across network 114. During operation, computing device 102 uses platform-independent virtual machine 104 to execute computer program instructions. Prior to executing the computer program instructions, code verifier 106 checks the computer program instructions to ensure that they will not corrupt other data and files located on computing device 102.

Application snapshot 118 defines the state of the executing computer program instructions on computing device 118. At some point in time, computing device 102 transfers application snapshot 118 across network 114 to computing device 108. Application snapshot 118 then becomes application snapshot 120 on computing device 108.

Computing device 108 can generally include any node on network 114 including computational capability and including a mechanism for communicating across network 114. During operation, computing device 108 receives application snapshot 120 from computing device 102 across network 114. Note that application snapshot 118 may be erroneously changed through corruption or by an attacker 116 during transfer to application snapshot 120 across network 114. To ensure that application snapshot 120 will not corrupt other data and files on computing device 108, code verifier 112 checks the computer program instructions within application snapshot 120 to ensure that the computer program instructions will not corrupt other data and files located on computing device 108. Code verifier 112 then retains the expected state of application snapshot 120 for each computer instruction within application snapshot 120 for later use by snapshot verifier 122 located within platform-independent virtual machine 110 on computing device 108. Snapshot verifier 122 within platform-independent virtual machine 110 on computing device 108 ensures that the state of application snapshot 120 is consistent with the current point of execution of the computer program instructions in application snapshot 120 as is described below.

Application Snapshot

Figure 2:
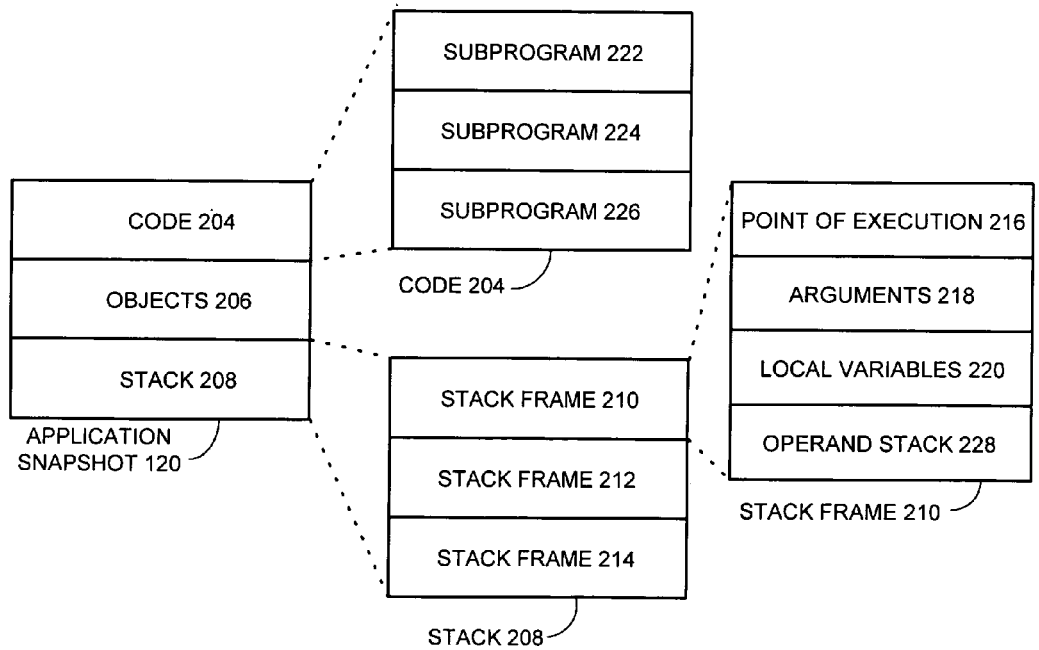
FIG. 2 illustrates an application snapshot in accordance with an embodiment of the present invention.

FIG. 2 illustrates application snapshot 120 in accordance with an embodiment of the present invention. Application snapshot 120 contains, but is not limited to, code 204, objects 206, and stack 208 which define the state of execution of code 204 when taken in combination. Code 204 contains, but is not limited to, subprograms 222, 224, and 226. Subprograms 222, 224, and 226 include, but are not limited to, the functions, subroutines, and methods that comprise the executing program. Objects 206 contains dynamic variables that are created by subprograms 222, 224, and 226 during execution. Stack 208 contains stack frames 210, 212, and 214.

Stack frames 210, 212, and 214 contain data for each open invocation of one of subprograms 222, 224, and 226. Representative stack frame 210 contains point of execution 216, arguments 218, local variables 220, and operand stack 228. Point of execution 216 points to the instruction within code 204 where execution resumes. Arguments 218 and local variables 220 constitute the changing data operated on by the executing subprogram. Local variables 220 and arguments 218 contain pointers to dynamic variables within objects 206. Operand stack 228 contains the operands currently being operated on by the executing subprogram. Each variable within objects 206, arguments 218, local variables 220, and operand stack 228 has an explicit type. Furthermore, application snapshot 120 has an implicit size based on the size of the components comprising application snapshot 120.

Computing device 108 uses snapshot verifier 122 and the expected state of application snapshot 120 to validate that each variable within objects 206, arguments 218, and local variables 220 is of the proper type. Computing device 108 also uses snapshot verifier 122 and the expected state of application snapshot 120 to validate that the size of application snapshot 120 agrees with the expected size of application snapshot 120.

Process of Restarting an Application Snapshot

Figure 3:
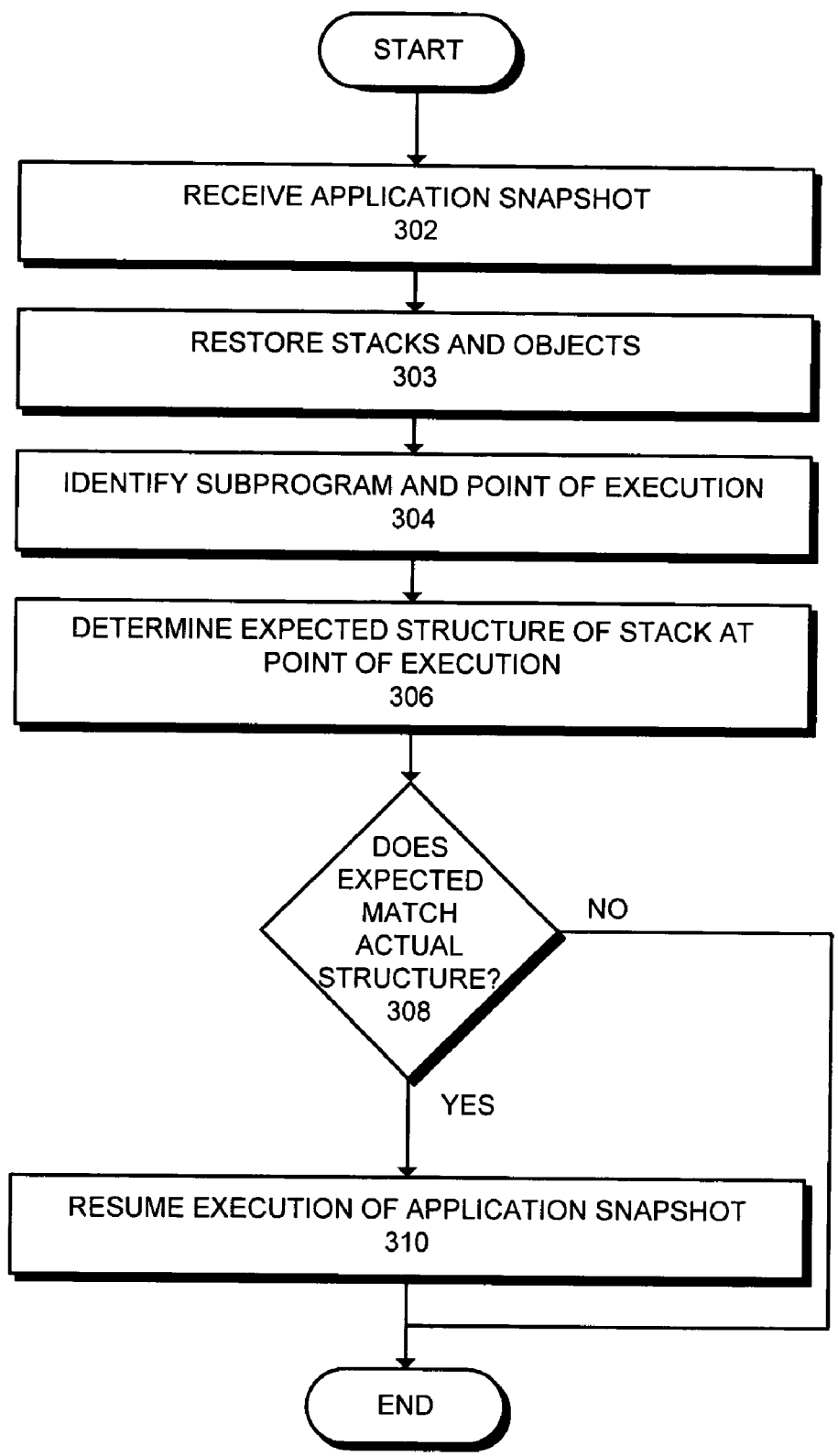
FIG. 3 is a flowchart illustrating the process of restarting an application snapshot in accordance with an embodiment of the present invention.

FIG. 3 is a flowchart illustrating the process of restarting an application snapshot on computing device 108. The system starts when application snapshot 120 is received across network 114 from computing device 102 (step 302). Platform-independent virtual machine 110 restores the operand stacks and objects in application snapshot 120 while changing any platform specific information, such as addresses (step 303). Next, platform-independent virtual machine 110 identifies the subprogram that is being executed and the point of execution within the subprogram (step 304). Platform-independent virtual machine 110 then uses code verifier 112 to ensure that the code will not cause operand stack overflows or underflows, that use of a local variable does not violate type safety, and that an argument of an instruction is of expected type. Code verifier 112 keeps the expected state of application snapshot 120 for each instruction (step 306). Snapshot verifier 122 then validates that the state of application snapshot 120 matches the expected state of application snapshot 120 (step 308). If the state of application snapshot 120 matches the expected state of application snapshot 120 (step 308), execution of application snapshot 120 is resumed on computing device 108 (step 310). If the state of application snapshot 120 does not match the expected state of application snapshot 120 (step 308), application snapshot 120 is not allowed to resume execution on computing device 108. In addition, notification may be made to an operator or security administrator of computing device 108.

Example Attack

As an example of a simple attack, consider the following sequence of Java bytecode instructions associated with, for example, operand stack 228 within application snapshot 120:

(1) new Foo (2) dup (3) invokespecial Foo.<init>( )

(4) . . .

Suppose that point of execution 216 was (2) when application snapshot 120 was taken indicating that (1) had just been completed. Operand stack 228 then contains one entry, a reference to an object of type Foo, the object located within objects 206. If received point of execution 216 is (2), code verifier 112 accepts the method because the code has not changed. Snapshot verifier 122 also accepts application snapshot 120 because operand stack 228 has the proper number and types of operands.

Now suppose someone tampered with application snapshot 120 by changing point of execution 216 to (3) in order to, possibly, compromise the receiving system's type safety. The received point of execution 216 is (3) in this case. Operand stack 228 should contain two references to an object of type Foo when point of execution 216 is (3) because the dup instruction at (2) would have generated an additional reference. Code verifier 112 again accepts the method because the code has not changed. In this case, however, snapshot verifier 122 rejects application snapshot 120 because the size of received operand stack 228 does not match the computed size of operand stack 228.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for verifying type safety of an application snapshot, the application snapshot including a state of an executing program that is moved from a first computing device to a second computing device across a network in order to continue execution on the second computing device, the method comprising:

receiving the application snapshot of the executing program from the first computing device on the second computing device, wherein the application snapshot includes a subprogram, an operand stack, and a point of execution;

wherein the operand stack contains operands currently being operated on by the executing subprogram;

examining the application snapshot on the second computing device to identify the subprogram being executed and the point of execution within the subprogram;

examining the subprogram on the second computing device to determine an expected structure of the operand stack at the point of execution;

validating that the state of the application snapshot on the second computing device is consistent with the expected structure of the operand stack;

verifying on the second computing device that variables and arguments within the application snapshot are of the proper type; and if the state of the application snapshot is validated as consistent with the expected structure of the operand stack, resuming execution of the application snapshot on the second computing device at the point of execution on the first computing device;

wherein the expected structure of the operand stack includes a collective size of entries and the types of entries expected on the operand stack at the point of execution within the subprogram; and wherein validating that the state of the application snapshot on the second computing device is consistent with the expected structure of the operand stack involves ensuring that the collective size of entries and the types of entries on the operand stack agree with the collective size of entries and the types of entries expected on the operand stack.

2. The method of claim 1, wherein examining the subprogram to determine the expected structure of the operand stack at the point of execution involves examining the subprogram with a code verifier, wherein the code verifier ensures that:

the subprogram does not cause the operand stack to overflow and underflow;

a use of a local variable does not violate type safety; and an argument of an instruction is of an expected type.

3. The method of claim 1, wherein the operand stack contains at least one local variable, at least one argument that is passed as a parameter to the subprogram, and an offset to the point of execution within the subprogram.

4. The method of claim 1, wherein resuming execution of the application snapshot involves restarting the subprogram at the point of execution within the second computing device.

5. The method of claim 1, further comprising restoring the state of an object within the application snapshot on the second computing device by changing a pointer from an address of the object on the first computing device to an address of the object on the second computing device.

6. A computer-readable storage medium storing instructions that when executed by a computer causes the computer to perform a method for verifying type safety of an application snapshot, the application snapshot including a state of an executing program that is moved from a first computing device to a second computing device across a network in order to continue execution on the second computing device, the method comprising:
   receiving the application snapshot of the executing program from the first computing device on the second computing device, wherein the application snapshot includes a subprogram, an operand stack, and a point of execution;
   examining the application snapshot on the second computing device to identify the subprogram being executed and the point of execution within the subprogram;
   wherein the operand stack contains operands currently being operated on by the executing subprogram;
   examining the subprogram on the second computing device to determine an expected structure of the operand stack at the point of execution;
   validating that the state of the application snapshot on the second computing device is consistent with the expected structure of the operand stack;
   verifying on the second computing device that variables and arguments within the application snapshot are of the proper type; and
   if the state of the application snapshot is validated as consistent with the expected structure of the operand stack, resuming execution of the application snapshot on the second computing device at the point of execution from the first computing device;
   wherein the expected structure of the operand stack includes a collective size of entries and the types of entries expected on the operand stack at the point of execution within the subprogram; and
   wherein validating that the state of the application snapshot on the second computing device is consistent with the expected structure of the operand stack involves ensuring that the collective size of entries and the types of entries on the operand stack agree with the collective size of entries and the types of entries expected on the operand stack.

7. The computer-readable storage medium of claim 6, wherein examining the subprogram to determine the expected structure of the operand stack at the point of execution involves examining the subprogram with a code verifier, wherein the code verifier ensures that:
   the subprogram does not cause the operand stack to overflow and underflow;
   a use of a local variable does not violate type safety; and
   an argument of an instruction is of an expected type.

8. The computer-readable storage medium of claim 6, wherein the operand stack contains at least one local variable, at least one argument that is passed as a parameter to the subprogram, and an offset to the point of execution within the subprogram.

9. The computer-readable storage medium of claim 6, wherein resuming execution of the application snapshot involves restarting the subprogram at the point of execution within the second computing device.

10. The computer-readable storage medium of claim 6, further comprising restoring the state of an object within the application snapshot on the second computing device by changing a pointer from an address of the object on the first computing device to an address of the object on the second computing device.

11. An apparatus that facilitates verifying type safety of an application snapshot, the application snapshot including a state of an executing program that is moved from a first computing device to a second computing device across a network in order to continue execution on the second computing device, comprising:
   a receiving mechanism that is configured to receive the application snapshot of the executing program from the first computing device on the second computing device, wherein the application snapshot includes a subprogram, an operand stack, and a point of execution;
   wherein the operand stack contains operands currently being operated on by the executing subprogram;
   an examination mechanism that is configured to examine the application snapshot on the second computing device to identify the subprogram being executed and the point of execution within the subprogram wherein, the examination mechanism is configured to also examine the subprogram to determine an expected structure of the operand stack at the point of execution;
   a validation mechanism that is configured to validate that the state of the application snapshot on the second computing device is consistent with the expected structure of the operand stack;
   a verifying mechanism configured to verify on the second computing device that variables and arguments within the application snapshot are of the proper type; and
   an execution mechanism that is configured to resume execution of the application snapshot on the second computing device at the point of execution from the first computing device if the state of the application snapshot is validated as consistent with the expected structure of the operand stack;
   wherein the expected structure of the operand stack includes a collective size of entries and the types of entries expected on the operand stack at the point of execution within the subprogram; and
   wherein validating that the state of the application snapshot on the second computing device is consistent with the expected structure of the operand stack involves ensuring that the collective size of entries and the types of entries on the operand stack agree with the collective size of entries and the types of entries expected on the operand stack.

12. The apparatus of claim 11, wherein the examination mechanism includes a code verifier, wherein the code verifier is configured to ensure that:
   the subprogram does not cause the operand stack to overflow and underflow;
   a use of a local variable does not violate type safety; and
   an argument of an instruction is of an expected type.

13. The apparatus of claim 11, wherein the operand stack contains at least one local variable, at least one argument that is passed as a parameter to the subprogram, and an offset to the point of execution within the subprogram.

14. The apparatus of claim 11, wherein in resuming execution of the application snapshot, the execution mechanism is configured to restart the subprogram at the point of execution within the second computing device.

15. The apparatus of claim 11, further comprising an object restoring mechanism that is configured to restore the state of an object within the application snapshot on the second computing device by changing a pointer from an address of the object on the first computing device to an address of the object on the second computing device.

* * * * *